(12) United States Patent
Hoelzl et al.

(10) Patent No.: US 11,385,030 B2
(45) Date of Patent: Jul. 12, 2022

(54) ELECTRONIC DAZZLING ELEMENT

(71) Applicant: Diehl Stiftung & Co. KG, Nuremberg (DE)

(72) Inventors: Johannes Hoelzl, Erlangen (DE);
Robert Stark, Bad Windsheim (DE);
Oliver Klettke, Nuremberg (DE);
Mathias Glasmacher, Reilingen (DE);
Wolfgang Cabanski, Heilbronn (DE)

(73) Assignee: Diehl Stiftung & Co. KG, Nuremberg (DE)

( * ) Notice: Subject to any disclaimer, the term of this patent is extended or adjusted under 35 U.S.C. 154(b) by 0 days.

(21) Appl. No.: 17/246,897

(22) Filed: May 3, 2021

(65) Prior Publication Data

US 2021/0254936 A1    Aug. 19, 2021

Related U.S. Application Data

(63) Continuation of application No. PCT/EP2019/079435, filed on Oct. 28, 2019.

(30) Foreign Application Priority Data

Nov. 2, 2018    (DE) .......................... 102018008663.2

(51) Int. Cl.
*F41H 13/00* (2006.01)
*G02B 27/30* (2006.01)

(52) U.S. Cl.
CPC ..... *F41H 13/0056* (2013.01); *F41H 13/0087* (2013.01); *G02B 27/30* (2013.01)

(58) Field of Classification Search
CPC .. F41H 13/0056; F41H 13/0087; G02B 27/30
See application file for complete search history.

(56) References Cited

U.S. PATENT DOCUMENTS

| | | | | |
|---|---|---|---|---|
| 7,048,408 B2* | 5/2006 | Dallas | ....................... | F21V 9/40 362/202 |
| 7,239,655 B2* | 7/2007 | Casazza | .............. | F41H 13/0056 359/15 |
| 8,113,689 B2* | 2/2012 | Mayo | ........................ | F42B 8/26 362/253 |
| 10,697,739 B1* | 6/2020 | Skipper | ............... | F41H 13/0087 |

(Continued)

FOREIGN PATENT DOCUMENTS

| | | |
|---|---|---|
| DE | 102015015339 A1 | 6/2017 |
| EP | 3023730 A1 | 5/2016 |

(Continued)

*Primary Examiner* — Arman B Fallahkhair
(74) *Attorney, Agent, or Firm* — Laurence A. Greenberg; Werner H. Stemer; Ralph E. Locher

(57) ABSTRACT

An electronic dazzling element has at least one optical emitter for emitting light pulses, which contains an electronic light-emitting device for generating light pulses, and a control device for controlling the light-emitting device of the optical emitter. In order to reduce the brightness reduction of the light pulses as a distance from the dazzling element increases, the optical emitter is configured to emit a collimated light beam. In order to simultaneously achieve the dazzling effect in as large a spatial region as possible, a beam direction of the collimated light beam may be changed.

5 Claims, 2 Drawing Sheets

(56) References Cited

U.S. PATENT DOCUMENTS

| | | | |
|---|---|---|---|
| 2005/0185403 A1* | 8/2005 | Diehl | F41H 13/0081 |
| | | | 362/259 |
| 2009/0154144 A1 | 6/2009 | Eisenberg et al. | |
| 2010/0072895 A1* | 3/2010 | Glynn | H05B 41/34 |
| | | | 315/76 |
| 2010/0285909 A1* | 11/2010 | Voelker | F41H 13/0087 |
| | | | 473/570 |
| 2013/0182441 A1* | 7/2013 | Nemeyer | F21V 14/065 |
| | | | 362/277 |
| 2016/0231090 A1* | 8/2016 | Bishop | H04R 17/00 |
| 2019/0285392 A1* | 9/2019 | Black | F41H 13/0081 |
| 2021/0219394 A1* | 7/2021 | van der Sijde | H05B 47/125 |

FOREIGN PATENT DOCUMENTS

| | | |
|---|---|---|
| EP | 3023731 A1 | 5/2016 |
| GB | 2555865 A | 5/2018 |
| KR | 20170009584 A | 1/2017 |
| WO | 2014066917 A1 | 5/2014 |
| WO | 2018091872 A1 | 5/2018 |

\* cited by examiner

ELECTRONIC DAZZLING ELEMENT

CROSS-REFERENCE TO RELATED APPLICATION

This application is a continuation, under 35 U.S.C. § 120, of copending international application No. PCT/EP2019/079435, filed Oct. 28, 2019, which designated the United States; this application also claims the priority, under 35 U.S.C. § 119, of German patent application No. 10 2018 008 663.2, filed Nov. 2, 2018; the prior applications are herewith incorporated by reference in their entirety.

BACKGROUND OF THE INVENTION

Field of the Invention

The present invention relates to an electronic dazzling element for emitting light pulses.

So-called flash grenades (stun grenades, flashbangs) are used to disorient people and confuse sensor systems. They are intended to bring about short-time blindness and disorientation through the emission of pulsed light at high intensity. In addition to pyrotechnic flash grenades, in which the light pulses are generated by means of an explosion reaction, electronic flash grenades in which the light pulses are generated by electronic emitters containing light-emitting means such as LEDs or laser diodes that are controllable by a control device have now also become known. Such electronic dazzling elements are disclosed, for example, in the commonly assigned European patent application EP 3 023 730 A1 and German patent application DE 10 2015 015 339 A1.

BRIEF SUMMARY OF THE INVENTION

It is an object of the invention to provide an improved electronic dazzling element that makes a greater range for an effective dazzling effect possible.

With the above and other objects in view there is provided, in accordance with the invention, an electronic dazzling element, comprising:
  at least one optical emitter for emitting light pulses, the optical emitter having an electronic light-emitting device for generating light pulses; and
  a control device configured for controlling the light-emitting device of the optical emitter;
  the optical emitter being configured to emit a collimated light beam, and wherein a beam direction of the collimated light beam is adjustable.

In other words, the electronic dazzling element according to the invention has at least one optical emitter for emitting light pulses, which has an electronic light-emitting means for generating light pulses, and a control device for controlling the light-emitting means of the optical emitter. According to the invention, the optical emitter is designed to emit a collimated light beam and a beam direction of the collimated light beam is able to be changed.

In other words, it is proposed to design the optical emitter to emit a collimated light beam in order to reduce the brightness reduction of the light pulses as the distance from the dazzling element increases. Owing to this targeted influencing of the light beams, the effective range of the emitted light pulses, in which they have an illuminance below a limit value for danger to the eyes, but above a threshold for glare, can be increased. Due to the configuration of the device, no increased energy consumption is necessary for this increase in range. In addition, it is proposed according to the invention to change a beam direction of the collimated light beam in order to simultaneously achieve the dazzling effect in the greatest possible solid angle region. In this way, despite the collimated light pulses, a spatially extended dazzling effect can be achieved, so that the overall efficiency of the dazzling element can be significantly increased.

The electronic dazzling element has at least one optical emitter, preferably a plurality of optical emitters. The optical emitters each contain an electronic light-emitting means, preferably LEDs or laser diodes or LED arrays or laser arrays. It is also advantageous if the light-emitting means contain LEDs or laser diodes in different emission colors so as to form so-called RGB clusters.

In one configuration of the invention, the optical emitter has at least one collimator in the beam direction upstream of the light-emitting means for collimating the light pulses emitted by the light-emitting means. The collimator is preferably a lens or a prism. The collimator is preferably formed from a plastics material.

In order to achieve the best possible collimation effect in this configuration, the light-emitting means is preferably positioned at the focal point of the collimator. In addition, it is particularly advantageous in this configuration if an emission surface of the light-emitting means is significantly smaller than an opening surface of the collimator, but the opening surface of the collimator is fully illuminated by the light pulse emitted by the light-emitting means.

In a further configuration of the invention, the optical emitter can alternatively or additionally have an electronic light-emitting means for generating collimated light pulses, such as laser sources, and/or at least one reflector in the beam direction downstream of and/or next to the light-emitting means for collimating the light pulses emitted by the light-emitting means.

To change the beam direction of the collimated light beam, various constructions are conceivable individually or in combination within the scope of the present invention.

In one embodiment variant of the invention, an emitter drive is provided for moving the emitter, which drive is controllable by the control device for changing the beam direction of the collimated light beam. If the dazzling element has a plurality of optical emitters, a plurality of emitter drives can be provided for moving a plurality of emitters independently of one another and/or emitter drives for jointly moving a plurality of emitters.

If the optical emitter has at least one collimator in the beam direction upstream of the light-emitting means for collimating the light pulses emitted by the light-emitting means, then, in another embodiment variant of the invention, a collimator drive is provided for moving the collimator that is controllable by the control device for changing the beam direction of the collimated light beam. If the dazzling element has a plurality of optical emitters, a plurality of collimator drives can be provided for moving the collimators of a plurality of emitters independently of one another and/or collimator drives for jointly moving the collimators of a plurality of emitters.

In a further embodiment variant of the invention, a dazzling element drive, which is controllable by the control device for moving the entire dazzling element and thus changing the beam direction of the collimated light beam, is provided for moving the dazzling element. Alternatively or additionally, an outer shape of the dazzling element can be designed in such a way that the dazzling element continues to move (for example rolls or jumps) after impact and thus changes the beam direction of the collimated light beam.

In addition to the at least one optical emitter, the dazzling element preferably also has at least one acoustic emitter for emitting sound pulses. In this way, the disorienting effect of the dazzling element can be further increased. The acoustic emitters preferably contain electronic sound generators such as piezoelectric sound transducers.

In one configuration of the invention, a communication device can additionally be provided, which is connected to the control device to the effect that the control device of the dazzling element can communicate with control devices of other optical and/or acoustic disorientation elements and/or with a higher-level controller in order to coordinate the controlling of the emitters of the various disorientation elements with respect to one another. The control of the emitters here comprises, in particular, setting the amplitude, phase, frequency, and pattern of the light pulses or sound pulses.

In one configuration of the invention, the dazzling element furthermore has a distance sensor for capturing a distance between the dazzling element and an object, which distance sensor is connected to the control device. In this case, the control device is preferably designed to control the optical emitter in dependence on the captured distance from an object. Using the captured distance data, for example parameters of the pulses, such as in particular their amplitudes and frequencies, can be optimally set.

In one configuration of the invention, the dazzling element furthermore has an integrated energy store. The energy store is preferably a rechargeable energy store. The energy store can be charged in a contactless manner (e.g. inductively) or via a connector plug.

In one configuration of the invention, the dazzling element furthermore has a self-destructing device for self-destructing the dazzling element, in particular its control device. Self-destruction, which is preferably triggered by remote control, can prevent the dazzling element from being taken into possession by third parties and being used against oneself.

Other features which are considered as characteristic for the invention are set forth in the appended claims.

Although the invention is illustrated and described herein as embodied in electronic dazzling element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of a specific embodiment when read in connection with the accompanying drawing.

DETAILED DESCRIPTION OF THE INVENTION

Figure 1:
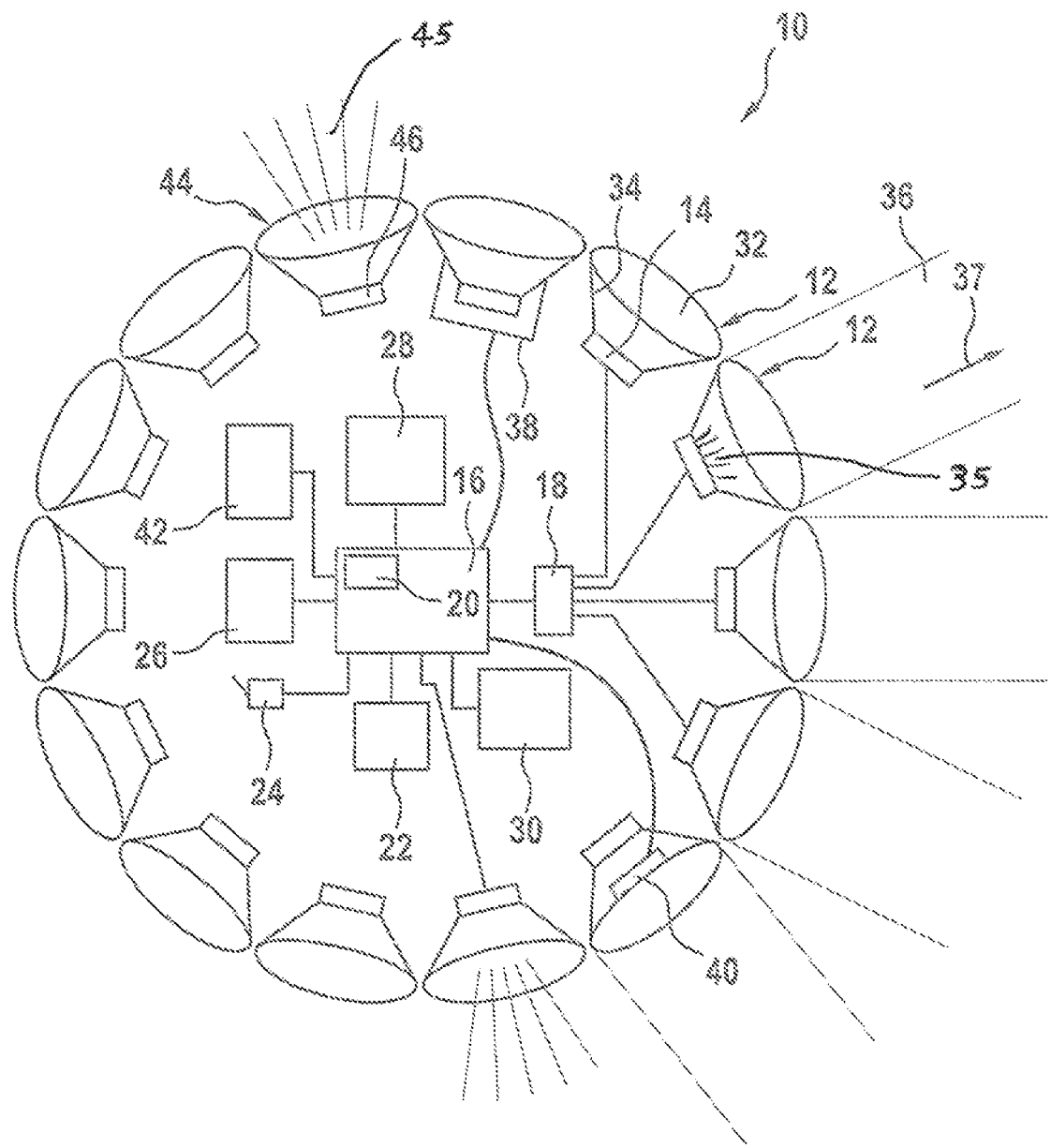
FIG. 1 is a partly schematic diagram illustrating the basic construction of an exemplary embodiment of an electronic dazzling element according to the invention.

Referring now to the figure of the drawing in detail, an exemplary dazzling element 10 has a substantially cylindrical or spherical housing, on the outer surface of which a number of optical emitters 12 are arranged. The optical emitters 12 each contain an electronic light-emitting device 14 for generating light pulses 35, such as LEDs, LED arrays, laser diodes, or laser arrays. The electronic light-emitting device, or light emitting means 14, is/are controlled by a control device 16 via a driver 18, which is connected therebetween, in order to set the amplitudes, frequencies, phases, and signal patterns, etc. of the emitted light pulses, i.e., of the pulsed light. For the sake of clarity, only some of the wired or wireless connections between the control device 16 and the light-emitting means 14 of the emitters 12 are shown in the figure.

In order to improve the disorienting effect, the dazzling element 10 is preferably also equipped with at least one acoustic emitter 44. The acoustic emitters 44 each contain an electronic sound generator 46 for generating sound pulses 45, such as, for example, a piezoelectric sound transducer. These electronic sound generators 46 are likewise controlled by the control device 16.

The control device 16 preferably contains a timer 20. The control device 16 is additionally connected to an activation switch 24 and/or a release mechanism, which can be actuated, for example, before the dazzling element 10 is thrown. Furthermore, the dazzling element 10 preferably contains a (for example electromagnetic or acoustic or optical) distance sensor 26 for capturing a distance between the dazzling element 10 and an object. Furthermore, the dazzling element 10 can also contain a position sensor for capturing its position (for example by means of a GPS or GNSS system) and/or an acceleration sensor for capturing its throw or its impact. In the exemplary embodiment in the FIGURE, the dazzling element 10 additionally optionally contains a communication device 28. The distance sensor 26 and the communication device 28 are likewise connected to the control device 16.

The activation switch 24, the release mechanism, the sensors 26 mentioned, and the communication device 28 serve as an activation mechanism for activating the control device 18, so that it controls the light-emitting device 14 of the optical emitters 12 and, if present, the sound generators 46 of the acoustic emitters 44 for emitting the light pulses or sound pulses, respectively, directly upon activation or—with the aid of the timer 24—a predetermined time after activation. The light pulses or sound pulses can thus be emitted for example a predetermined time after actuation of the activation switch 22 or of the release mechanism, when the object distance captured by the distance sensor 26 falls below a predetermined limit value, when the dazzling element 10 arrives at a predetermined position, a predetermined time after a throw or an impact of the dazzling element 10, etcetera.

The object distance captured with the distance sensor 26 can additionally be used by the control device 16 to adapt the pulses emitted by the emitters 12, 44 to the object distance. For example, the brightness of light pulses can be adapted to the object distance.

The communication device 28 can be used to receive an activation signal from a remote control. In addition, the communication device 28 can serve for the communication of the control device 16 with control devices of other dazzling elements or a higher-level controller. In this way, the pulses of the emitters 12, 44 of different dazzling elements 10 can be coordinated with one another. For example, the light pulses or sound pulses can be emitted synchronously or in a well-defined pattern.

The dazzling element 10 is preferably also equipped with an energy store 22, preferably a rechargeable energy store, for supplying energy to the electronic components of the dazzling element 10.

In addition, the dazzling element 10 is optionally also provided with a self-destructing device 30. Should a dazzling element 10 get into the hands of third parties and there is a risk that they will use the dazzling element 10 against oneself, the self-destructing device 30 can be activated by remote control via the communication device 28 in order to destroy the dazzling element 10, in particular its control device 16.

As is illustrated in the FIGURE, the optical emitters 12 of the dazzling element 10 are designed in such a way that they emit collimated light beams 36 in beam directions 37 that differ from one another. The emission of bright light pulses is intended to disorient or temporarily dazzle people or sensor systems in the vicinity of the dazzling element 10. Due to the collimated light emission, an illuminance lying within a specific interval, for example below the limit value for danger to the eyes (i.e., permanent damage to the eye), but above the threshold for sufficient glare, can be achieved over the greatest possible range.

Due to the collimated emission of the light pulses, the range in which the desired disorienting effect can be achieved can not only be increased but also specifically adapted. This takes place through a targeted setting of the emitting surface of the emitter 12, i.e., the cross-sectional area of the collimated light beam 36, and of the divergence angle of the collimated light beam 36. As a result, the decrease in the brightness of the light pulses as the distance from the dazzling element 10 increases can be reduced compared to dazzling elements with isotropically or diffusely emitting emitters. And this result can be achieved without increasing the energy consumption.

The emission of the collimated light beams 36 can be achieved, for example, by one or more of the measures discussed below.

According to a first measure, the optical emitters 12 can use electronic light-emitting means 14, which themselves have a directional radiation pattern. This is the case, for example, in the case of laser sources, such as laser diodes.

According to a second measure, collimators 32, with which the light beams emitted by the light-emitting means 14 can be collimated, can be placed upstream of the light-emitting means 14 in the emission direction 37. Lenses or prisms, for example made of a plastics material, can be used, for example, as the collimators 32. In the exemplary embodiment of the FIGURE, each optical emitter 12 has a collimator 32 and forms a unit therewith. Alternatively, the collimators 32 for a plurality of emitters 12 can be mounted next to one another at/in a common element, for example by being pressed into a common plastics plate.

The distance between the collimator 32 and the light-emitting means 14 is preferably selected such that the light-emitting means 14 lies as precisely as possible in the focal point of the collimator 32. By varying this distance between the collimator 32 and the light-emitting means 14, the divergence angle of the light beam on the side of the collimator 32 facing away from the light-emitting means 14 can be set. In addition, the emission surface of the light-emitting means 14 is advantageously smaller than the opening surface of the collimator 32. In order to achieve the best possible collimation of the light beam, it is particularly expedient if the emission surface of the light-emitting means 14 is significantly smaller than the opening surface of the collimator 32 and the radiation pattern of the light-emitting means 14 is designed in such a way that the entire opening surface of the collimator 32 is illuminated.

According to a third measure, at least one reflector 34 can be provided downstream of and/or around the light-emitting means 14. The reflector 34 can be provided, for example, by a reflective wall of the optical emitter 12.

Since a smaller solid angle region is covered by a collimated light beam 36 compared to a non-collimated, isotropic light beam, provision is also made in the case of the dazzling element 10 of the invention that the beam direction 37 of the collimated light beam 36 can be changed. In this way, a dazzling effect can be achieved in a larger solid angle region within a period of time and thus the effectiveness of the dazzling element 10 can be increased. The change in direction of the collimated light beam 36 can be continuous or incremental, depending on the embodiment.

The beam direction 36 of the collimated light beam 36 can be changed, for example, by one or more of the measures discussed below.

According to a first measure, the optical emitters 12 can be provided with emitter drives 38 for moving the respective emitter 12 or with a common emitter drive, which are controllable by the control device 16. With a movement of the entire emitter 12, the beam direction 37 of the collimated light beam 36 emitted by it also automatically changes.

According to a second measure, the optical emitters 12 can be provided with collimator drives 40 for moving the respective collimator 32 or with a common collimator drive for a plurality of collimators 32, which are controllable by the control device 16. By moving the collimator 32, the collimation effect and thus automatically also the beam direction 37 of the collimated light beam 36 are changed.

According to a third measure, the dazzling element 10 can be equipped with a dazzling element drive 42, which is controllable by the control device 16, for moving the entire dazzling element 10. For example, an eccentric, which is provided with a drive, can be arranged in the interior of the dazzling element 10. By moving the entire dazzling element 10, the beam directions 37 of the collimated light beams 36 of all optical emitters 12 are automatically changed.

According to a fourth measure, an outer shape of the dazzling element 10 can be designed in such a way that the dazzling element 10 continues to move after impact, that is to say, for example, continues to roll or jump after its initial impact or initial landing. As a result of the movement of the dazzling element 10 as a whole, the beam directions 37 of the collimated light beams 36 of all optical emitters 12 are automatically changed.

The various drives 38, 40, 42 mentioned can be controlled or closed-loop controlled (i.e., regulated) in this context depending on different parameters, such as the solid angle illuminated by the collimated light beam 36, the irradiance of the optical emitter 12, the typical relaxation time of the photoreceptors of the human eye and the like.

Figure 2A:
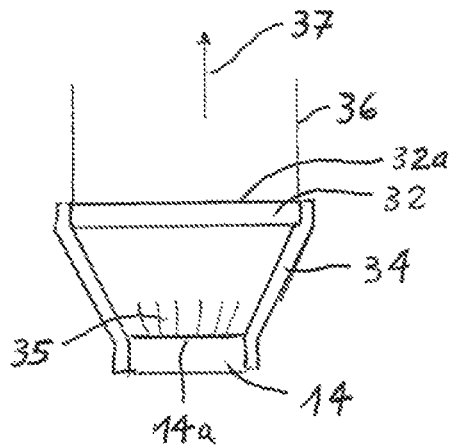
FIG. 2A is an enlarged view of an optical emitter.

FIG. 2A shows the structure of the optical emitter 12 on an enlarged scale, as compared to FIG. 1. The optical emitter 12 includes an emission surface 14a of the light-emitting device 14 and indicates the light pulses 35 generated by the light-emitting device 14 and an opening surface 32a of the collimator 32.

Figure 2B:
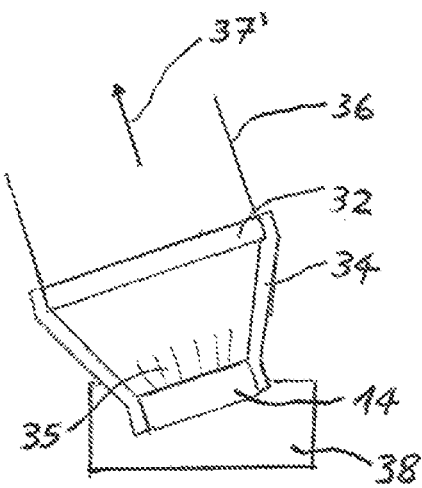
FIG. 2B is a view similar to FIG. 2A showing the optical emitter with a beam direction changed by an emitter drive.

FIG. 2B shows an embodiment of the light-emitting device 14 in which the beam direction 37 is changed by moving the optical emitter 12 using the emitter drive 38 to provide a changed beam direction 37'.

Figure 2C:
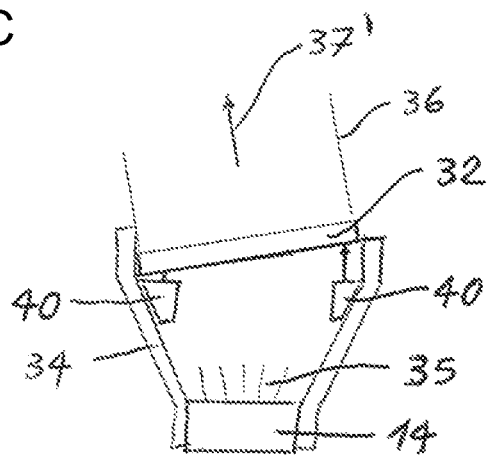
FIG. 2C is another view similar to FIG. 2A showing the optical emitter with a beam direction changed by a collimator drive.

FIG. 2C shows an embodiment of the light-emitting device 14 in which the beam direction 37 is changed by moving the collimator 32 using the collimator drive 40 to provide a changed beam direction 37'.

The following is a summary list of reference numerals and the corresponding structure used in the above description of the invention:

10 Electronic dazzling element
12 Optical emitter
14 Light-emitting means/device
14a Emission surface of Light-emitting device
16 Control device
18 Driver
20 Timer
22 Energy store
24 Activation switch
26 Distance sensor
28 Communication device
30 Self-destructing device
32 Collimator, especially lens or prism
32a Opening surface of Collimator
34 Reflector
35 Light pulses generated by Light-emitting device
36 Collimated light beam
37 Beam direction
37' Changed beam direction
38 Emitter drive
40 Collimator drive
42 Dazzling element drive
44 Acoustic emitter
45 Sound pulses
46 Sound generator

The invention claimed is:

1. An electronic dazzling element comprising: at least one optical emitter for emitting a collimated light-beam in a beam direction, said optical emitter having an electronic light-emitting device for generating light pulses, and at least one collimator upstream of said light-emitting device in the beam direction for collimating the light pulses emitted by said light-emitting device; a control device configured for controlling said light-emitting device of said optical emitter; a collimator drive connected to and controllable by said control device, said collimator drive being configured for changing the beam direction of the collimated light beam by changing an orientation of said collimator relative to said light-emitting device; and an emitter drive connected to and controllable by said control device, said emitter drive being configured for changing the beam direction of the collimated light beam by changing an orientation of said optical emitter relative to the dazzling element.

2. The dazzling element according to claim 1, wherein said collimator has a focal point and said light-emitting device is positioned at the focal point of said collimator.

3. The dazzling element according to claim 1, wherein an emission surface of said light-emitting device is smaller than an opening surface of said collimator and said opening surface of said collimator is fully illuminated by the light pulse emitted by said light-emitting device.

4. The dazzling element according to claim 1, wherein said optical emitter includes at least one of:
   (i) an electronic light-emitting device for generating collimated light pulses; or
   (ii) at least one reflector in the beam direction downstream of said light-emitting device for collimating the light pulses emitted by said light-emitting device; or
   (iii) at least one reflector in the beam direction next to said light-emitting device for collimating the light pulses emitted by said light-emitting device.

5. The dazzling element according to claim 1, further comprising at least one acoustic emitter for emitting sound pulses.

* * * * *